United States Patent [19]

Shipley et al.

[11] 4,379,760
[45] Apr. 12, 1983

[54] HIGH EFFICIENCY CATALYST FOR POLYMERIZING OLEFINS

[75] Inventors: Randall S. Shipley, Alvin, Tex.; Kirby Lowery, Jr., Baton Rouge, La.; Ronald L. Gibbs, Midland, Mich.

[73] Assignee: The Dow Chemical Company, Midland, Mich.

[21] Appl. No.: 320,650

[22] Filed: Nov. 12, 1981

[51] Int. Cl.$^3$ .............................................. C08F 4/64
[52] U.S. Cl. .......................... 252/429 B; 252/429 C; 252/431 R; 526/125; 526/119
[58] Field of Search ............ 252/429 B, 429 C, 431 R

[56] References Cited

U.S. PATENT DOCUMENTS

| | | | |
|---|---|---|---|
| 2,948,712 | 8/1960 | Coover | 252/429 C X |
| 3,070,549 | 12/1962 | Ziegler et al. | 252/429 |
| 3,257,332 | 6/1966 | Ziegler et al. | 252/429 |
| 3,489,731 | 1/1970 | Imoto et al. | 260/80.78 |
| 3,520,826 | 7/1970 | Tanaka et al. | 252/429 |
| 3,654,249 | 4/1972 | Diedrich et al. | 252/429 C X |
| 3,687,910 | 8/1972 | Jones | 260/80.78 |
| 3,943,067 | 3/1976 | Chan et al. | 252/429 C X |
| 3,989,878 | 11/1976 | Aishima et al. | 526/116 |
| 4,006,101 | 2/1977 | Matsuura et al. | 252/429 R |
| 4,064,334 | 12/1977 | Kuroda et al. | 252/429 C X |
| 4,067,822 | 1/1978 | Gessell et al. | 252/429 B |
| 4,091,082 | 5/1978 | Gessell et al. | 423/413 |
| 4,104,198 | 8/1978 | May, Jr. et al. | 252/429 B |
| 4,109,071 | 8/1978 | Berger et al. | 526/114 |
| 4,163,831 | 8/1979 | Gessell | 527/153 |
| 4,167,493 | 9/1979 | Hsieh | 252/429 B |
| 4,172,050 | 10/1979 | Gessell | 252/431 R |
| 4,213,880 | 7/1980 | Knight et al. | 252/431 R |
| 4,244,838 | 1/1981 | Gessell | 252/492 B |
| 4,245,071 | 1/1981 | Kondo et al. | 526/114 |
| 4,246,383 | 1/1981 | Gessell | 526/92 |
| 4,250,286 | 2/1981 | Shipley | 526/125 |
| 4,269,733 | 5/1981 | Shipley | 252/429 C |
| 4,310,648 | 1/1982 | Shipley et al. | 252/431 R X |

FOREIGN PATENT DOCUMENTS

| | | |
|---|---|---|
| 2758312 | 7/1978 | Fed. Rep. of Germany . |
| 51-111281 | 10/1976 | Japan . |
| 51-148785 | 12/1976 | Japan . |
| 52-98076 | 8/1977 | Japan . |
| 1235062 | 6/1971 | United Kingdom . |
| 1305610 | 2/1973 | United Kingdom . |
| 1352901 | 6/1974 | United Kingdom . |
| 1492379 | 11/1977 | United Kingdom . |
| 1500873 | 2/1978 | United Kingdom . |
| 1502567 | 3/1978 | United Kingdom . |

OTHER PUBLICATIONS

L. Petkov, R. Kyrtcheva, Ph. Radenkov and D. Dobreva, Rev. 1-3-78, Organometallics in ethylene polymerization with a catalyst system TiCl$_4$/Al(C$_2$H$_5$)Cl/Mg(C$_6$H$_5$)$_2$:1. Suspension polymerization process; Polymer, vol. 19, May 1988, pp. 567-569.

Primary Examiner—Patrick Garvin
Attorney, Agent, or Firm—J. G. Carter

[57] ABSTRACT

Compositions exhibiting high catalytic activity in the polymerization of α-olefins are prepared by reacting a mixture of a tetrahydrocarbyloxy titanium compound such as tetraisopropyl titanate and a hydrocarbyloxy titanium oxide such as di(isopropoxy) titanium oxide, an organomagnesium component such as a hydrocarbon soluble complex of dialkyl magnesium and an organo-aluminum compound such as triethyl aluminum and a halide source such as ethyl aluminum dichloride. Polymerization processes employing this catalyst composition do not require conventional catalyst removal steps in order to provide polymers having suitable color and other physical characteristics and these catalysts provide higher efficiencies than those catalysts employing either of the titanium compounds alone.

7 Claims, No Drawings

HIGH EFFICIENCY CATALYST FOR POLYMERIZING OLEFINS

BACKGROUND OF THE INVENTION

This invention relates to a new catalyst composition useful for initiating and promoting polymerization of α-olefins and to a polymerization process employing such a catalyst composition.

It is well known that olefins such as ethylene, propylene and 1-butene in the presence of metallic catalysts, particularly the reaction products of organo-metallic compounds and transition metal compounds, can be polymerized to form substantially unbranched polymers of relatively high molecular weight. Typically such polymerizations are carried out at relatively low temperatures and pressures.

Among the methods for producing such linear olefin polymers, some of the most widely utilized are those described by Professor Karl Ziegler in U.S. Pat. Nos. 3,113,115 and 3,257,332. In these methods, the catalyst employed is obtained by admixing a compound of a transition metal of Groups IVB, V, VIB and VIII of Mendeleev's Period Table of Elements with an organometallic compound. Generally, the halides, oxyhalides and alkoxides or esters of titanium, vanadium and zirconium are the most widely used transition metal compounds. Common examples of the organometallic compounds include the hydrides, alkyls and haloalkyls of aluminum, alkylaluminum halides, Grignard reagents, alkali metal aluminum hydrides, alkali metal borohydrides, alkali metal hydrides, alkaline earth metal hydrides and the like. Usually, polymerization is carried out in a reaction medium comprising an inert organic liquid, e.g., an aliphatic hydrocarbon and the aforementioned catalyst. One or more olefins may be brought into contact with the reaction medium in any suitable manner. A molecular weight regulator, which is normally hydrogen, is usually present in the reaction vessel in order to suppress the formation of undesirably high molecular weight polymers.

Following polymerization, it is common to remove catalyst residues from the polymer by repeatedly treating the polymer with alcohol or other deactivating agent such as aqueous base. Such catalyst deactivation and/or removal procedures are expensive both in time and material consumed as well as the equipment required to carry out such treatment.

Furthermore, most of the aforementioned known catalyst systems are more efficient in preparing polyolefins in slurry (i.e., wherein the polymer is not dissolved in the carrier) than in solution (i.e., wherein the temperature is high enough to solubilize the polymer in the carrier). The lower efficiencies of such catalysts in solution polymerization is generally believed to be caused by the general tendency of such catalysts to become rapidly depleted or deactivated by the significantly higher temperatures that are normally employed in solution processes. In addition, processes involving the copolymerization of ethylene with higher α-olefins exhibit catalyst efficiencies significantly lower than ethylene homopolymerization processes.

Recently, catalysts having higher efficiencies have been disclosed, e.g., U.S. Pat. No. 3,392,159; U.S. Pat. No. 3,737,393; West German Patent Application No. 2,231,982 and British Pat. Nos. 1,305,610 and 1,358,437. While the increased efficiencies achieved by using these recent catalysts are significant, even higher efficiencies are desirable, particularly in copolymerization processes. These high efficiency catalysts generally produce polymers of relatively narrow molecular weight distribution.

In view of the foregoing problems encountered in the use of conventional Ziegler catalysts, it would be highly desirable to provide a polymerization catalyst that is sufficiently active, even at solution polymerization temperatures above 140° C., to produce such high quantities of olefin homopolymers or copolymers per unit of catalyst that it is no longer necessary to remove catalyst residue in order to obtain a polymer of the desired purity.

SUMMARY OF THE INVENTION

The present invention, in one aspect, is an improvement in the catalytic reaction product of (A) a tetravalent titanium compound, (B) an organo-magnesium component, (C) a halide source, and, if either components (B) or (C) does not contain sufficient quantities of aluminum, then (D) an aluminum compound is also present; the improvement being the use of, as the titanium compound, a mixture containing a tetrahydrocarbyloxy titanium compound and a dihydrocarbyloxy titanium oxide. The magnesium component is (1) a complex of an organomagnesium compound and an organometallic compound which solubilizes the organomagnesium compound in a hydrocarbon solvent or (2) an organo-magnesium compound. The proportions of the foregoing components of said catalytic reaction products are such that the atomic ratios of the elements are:

Mg:Ti is from about 1:1 to about 200:1; preferably from about 2:1 to about 100:1; most preferably from about 5:1 to about 75:1;

Al:Ti is from about 0.1:1 to about 1000:1; preferably from about 0.5:1 to about 200:1; most preferably from about 1:1 to about 75:1;

excess X:Al is from about 0.0005:1 to about 5:1; preferably from about 0.001:1 to about 2:1; most preferably from about 0.01:1 to about 1.4:1.

The X is excess halide above that which would be theoretically required to convert the magnesium compound to the dihalide.

The molar ratio of the tetraalkoxy titanium compound to dialkoxy titanium oxide is from about 0.1:1 to about 10:1, preferably from about 0.2:1 to about 5:1 and most preferably from about 0.33:1 to about 3:1.

In a second aspect, the invention is a process for polymerizing at least one α-olefin or diolefin under conditions characteristic of Ziegler polymerization wherein the aforementioned reaction product is employed as the catalyst.

DETAILED DESCRIPTION OF THE PREFERRED EMBODIMENTS

The present invention is most advantageously practiced in a polymerization process wherein an α-olefin or diolefin is polymerized, generally in the presence of hydrogen as a molecular weight control agent, in a polymerization zone containing an inert diluent and the catalytic reaction product as hereinbefore described. Especially advantageous is the copolymerization of ethylene and higher α-olefins or diolefins using the catalytic reaction product of this invention. The foregoing polymerization process is most beneficially carried out under inert atmosphere and relatively low temperature and pressure, although very high pressures are optionally employed.

Olefins which are suitably homopolymerized or copolymerized in the practice of this invention are generally the aliphatic α-monoolefins or α-diolefins having from 2 to 18 carbon atoms. Illustratively, such α-olefins can include ethylene, propylene, butene-1, pentene-1, 3-methylbutene-1, 4-methylpentene-1, hexene-1, octene-1, dodecene-1, octadecene-1, 1,7-octadiene and the like. It is understood that α-olefins may be copolymerized with other α-olefins and/or with small amounts, i.e. up to about 25 weight percent based on the copolymer, of other ethylenically unsaturated monomers such as styrene, α-methylstyrene and similar ethylenically unsaturated monomers which do not destroy conventional Ziegler catalysts. Most benefits are realized in the polymerization of aliphatic α-monoolefins, particularly ethylene and mixtures of ethylene and up to 50, especially from about 0.1 to about 40, weight percent of propylene, butene-1, hexene-1, octene-1, 4-methylpentene-1, 1,7-octadiene or similar α-olefin or diolefin based on total monomer.

Advantageously, the titanium tetraalkoxide is represented by the empirical formula $ti(OR)_4$ wherein each R is independently an alkyl or an aryl group having from 1 to about 12, preferably from about 2 to about 10, carbon atoms. Exemplary of such compounds include tetra-n-butoxytitanium, tetra(isopropoxy)titanium, tetraphenoxytitanium and the like.

Advantageously, the dialkoxy titanium oxide is represented by the empirical formula $(RO)_2TiO$ wherein each R is independently an alkyl or an aryl group having from 1 to about 12, preferably from about 2 to about 10, carbon atoms. Exemplary of such compounds are diethyoxy titanium oxide, diisopropoxy titanium oxide, di-n-butoxy titanium oxide, diphenoxy titanium oxide, mixtures thereof and the like.

The dihydrocarboxy titanium oxides employed in the present invention can be prepared according to the procedure described in THE ORGANIC CHEMISTRY OF TITANIUM, Raoul Feld and P. O. Cowe, Butterworth & Co. (Publishers) Ltd., 1965, page 141.

The preferred organomagnesium component is a hydrocarbon soluble complex illustrated by the empirical formula $MgR''_2.xMR''_y$ wherein each R" is independently hydrocarbyl or hydrocarbyloxy; M is aluminum, zinc or mixtures thereof; x is about zero to 10, especially from about zero to about 2.5, and y denotes the number of hydrocarbyl groups which corresponds to the valence of M. As used herein, hydrocarbyl and hydrocarbyloxy are monovalent hydrocarbon radicals. Preferably, hydrocarbyl is alkyl, cycloalkyl, aryl, aralkyl, alkenyl and similar hydrocarbon radicals having 1 to 20 carbon atoms, with alkyl having 1 to 10 carbon atoms being especially preferred. Likewise, preferably, hydrocarbyloxy is alkoxy, cycloalkyloxy, aryloxy, aralkyloxy, alkenyloxy and similar oxyhydrocarbon radicals having 1 to 20 carbon atoms, with alkyloxy having 1 to 10 carbon atoms being preferred. Hydrocarbyl is preferred over hydrocarbyloxy. This complex is prepared by reacting particulate magnesium, such as magnesium turnings, or magnesium particles with about a stoichiometric amount of hydrocarbyl or hydrocarbyloxy halide, illustrated as R'X. The resulting $MgR''_2$, if it is hydrocarbon insoluble, can be solubilized by adding the organometallic compound such as $AlR''_3$ or mixtures thereof with $ZnR''_2$. The amount of organometallic compounds which is added to the $MgR''_2$ to form the organomagnesium complex should be enough to solubilize a significant amount of $MgR''_2$, e.g., at least 5 weight percent of $MgR''_2$ is solubilized. It is preferred to solubilize at least 50 weight percent of the $MgR''_2$ and especially preferred to solubilize all the $MgR''_2$. In order to obtain maximum catalyst efficiency at polymerization temperatures above 180° C., it is desirable to minimize the amount of aluminum in the complex as well as in the total catalyst. Accordingly, for catalysts having Al:Ti atomic ratios less than 120:1 it is desirable to have a Mg:Al atomic ratio more than 0.3:1, preferably from about 0.5:1 to 10:1. In suitable complexes, organometallic compounds (other than $AlR''_3$, $ZnR''_2$ or mixtures thereof) which also solubilize the organomagnesium compound in hydrocarbon are employed in beneficial amounts, usually an amount sufficient to produce an atomic ratio of 0.01:1 to 10:1 of metal of the organometallic compounds to magnesium. Examples of such other organometallic compounds include boron trialkyls such as boron triethyl, alkyl silanes such as dimethyl silane and tetraethyl silane, alkyl tin and alkyl phosphorous compounds.

Alternative to the aforementioned solubilized magnesium complexes, it is also advantageous to employ organomagnesium compounds as the organomagnesium component. Such compounds, although often insoluble in hydrocarbons, are suitably employed. These compounds can be rendered soluble in hydrocarbon by addition of ether, amine, etc., although such solubilizing agents often reduce the activity of the catalyst. Recently, such compounds have been made hydrocarbon soluble without using such catalyst poisons, e.g., as taught in U.S. Pat. No. 3,646,231. The more recent hydrocarbon soluble organomagnesium compounds are the most desirable if an organomagnesium compound is to be used as the organomagnesium component.

Preferably the organomagnesium compound is a hydrocarbon soluble dihydrocarbylmagnesium such as the magnesium dialkyls and the magnesium diaryls. Exemplary suitable magnesium dialkyls include particularly n-butyl-sec-butyl magnesium, diisopropyl magnesium, di-n-hexyl magnesium, isopropyl-n-butyl magnesium, ethyl-n-hexyl magnesium, ethyl-n-butyl magnesium, di-n-octyl magnesium and others wherein alkyl is from 1 to 20 carbon atoms. Exemplary suitable magnesium diaryls include diphenylmagnesium, dibenzylmagnesium, and ditolylmagnesium, being especially preferred. Suitable organomagnesium compounds include alkyl and aryl magnesium alkoxides and aryloxides and aryl and alkyl magnesium halides with the halogen-free organomagnesium compounds being more desirable.

Suitable organoaluminum compounds include those represented by the empirical formula $AlR_{3-a}X_a$ wherein R is hydrocarbyl, hydrocarbyloxy or as hereinbefore defined such as alkyl; X is a halogen and a is a number from zero to 3. Most preferred are the aluminum alkyls such as, for example, triethyl aluminum, triisobutyl aluminum, diethylaluminum chloride, diethylaluminum bromide, mixtures thereof and the like.

It is understood that the organic moieties of the aforementioned organomagnesium, e.g., R", and the organic moieties of the halide source, e.g., R and R', are suitably any other organic radical provided that they do not contain functional groups that poison conventional Ziegler catalysts. Preferably such organic moieties do not contain active hydrogen, i.e. those sufficiently active to react with the Zerewitinoff reagent.

The halide source is suitably a nonmetallic halide corresponding to the empirical formula R'X wherein R' is hydrogen or an active monovalent organic radical and X is halogen. Alternatively, the halide source is a metallic halide corresponding to the empirical formula $MR_{y-a}X_a$ wherein M is a metal of Group IIIA or IVA of Mendeleev's Periodic Table of the Elements, R is a monovalent organic radical, usually hydrocarbyl or hydrocarbyloxy, X is halogen, y is a number corresponding to valence of M and a is a number from 1 to y.

The preferred halide sources are the active non-metallic halides of the formula set forth above including hydrogen halides and active organic halides such as t-alkyl halides, allyl halides, benzyl halides and other active hydrocarbyl halides wherein hydrocarbyl is as defined hereinbefore. By an active organic halide it is meant a hydrocarbyl halide that contains a halide atom at least as active, i.e., as easily lost to another compound, as the halogen of sec-butyl chloride, and preferably as active as t-butyl chloride. In addition to the organic monohalides, it is understood that organic dihalides, triahalides and other polyhalides that are active as defined hereinbefore are also suitably employed. Examples of preferred active non-metallic halides include hydrogen chloride, hydrogen bromide, t-butyl chloride, t-amyl bromide, allyl chloride, benzyl chloride, crotyl chloride, methylvinyl carbinyl chloride, α-phenylethyl bromide, diphenyl methyl chloride, t-butyl chloride, allyl chloride and benzyl chloride.

Suitable metallic halides as set forth by formula hereinbefore are organometallic halides and metal halides wherein the metal is in Group IIIA or IVA, of Mendeleev's Periodic Table of Elements. Preferred metallic halides are aluminum halides of the empirical formula $AlR_{3-a}X_a$ wherein each R is independently hydrocarbyl as hereinbefore defined such as alkyl; X is a halogen and a is a number from 1 to 3. Most preferred are alkylaluminum halides such as ethylaluminum sesquichloride, diethylaluminum chloride, ethylaluminum dichloride and diethylaluminum bromide, with ethylaluminum dichloride being especially preferred. Alternatively, a metal halide such as aluminum trichloride or a combination of aluminum trichloride with an alkyl aluminum halide or a trialkyl aluminum compound may be suitably employed.

In order to maximize catalyst efficiency, the catalyst is prepared by mixing the components of the catalyst in an inert liquid diluent in one of the following especially preferred order;

(1) A, D (if necessary), C and B;
(2) B, C, D (if necessary) and A;
(3) B, C, A and D (if necessary and if C is not a tin chloride);
(4) C, D (if necessary), A and B with methods 2 and 3 being especially preferred. The foregoing catalyst components are combined in proportions sufficient to provide molar and atomic ratios as previously mentioned.

The foregoing catalytic reaction is preferably carried out in the presence of an inert diluent. The concentrations of catalyst components are preferably such that when the essential components of the catalytic reaction product are combined, the resultant slurry is from about 0.005 to about 1.0 molar (moles/liter) with respect to magnesium. By way of an example of suitable inert organic diluents can be mentioned liquefied ethane, propane, isobutane, n-butane, n-hexane, the various isomeric hexanes, isooctane, paraffinic mixtures of alkanes having from 8 to 12 carbon atoms, cyclohexane, methylcyclopentane, dimethylcyclohexane, dodecane, 2,2,4-trimethylpentane industrial solvents composed of saturated or aromatic hydrocarbons such as kerosene, naphthas, etc., especially when freed of any olefin compounds and other impurities, and especially those having boiling points in the range from about 50° C. to about 200° C. Also included as suitable inert diluents are benzene, toluene, ethylbenzene, cumene, decalin and the like.

Mixing of the catalyst components to provide the desired catalytic reaction product is advantageously carried out under an inert atmosphere such as nitrogen, argon or other inert gas at temperatures in the range from about −100° C. to about 200° C., preferably from about 0° C. to about 100° C. The period of mixing is not considered to be critical as it is found that a sufficient catalyst composition most often occurs within about 1 minute or less. In the preparation of the catalytic reaction product, it is not necessary to separate hydrocarbon soluble components from hydrocarbon insoluble components of the reaction product.

If desired, the catalytic reaction product of this invention may also contain a dialkyl zinc component wherein the alkyl groups are the same or different and contain from 1 to about 10 carbon atoms. Suitable such dialkyl zinc compounds include, for example, diethyl zinc, diisopropyl zinc, di-n-propyl zinc, di-n-butyl zinc, di-sec-butyl zinc, mixtures thereof and the like. Such zinc compounds tend to provide polymers of broadened molecular weight distribution, as taught in U.S. Pat. No. 4,238,355.

In the polymerization process employing the aforementioned catalytic reaction product, polymerization is effected by adding a catalytic amount of the above catalyst composition to a polymerization zone containing α-olefin monomer, or vice versa. The polymerization zone is maintained at temperatures in the range from about 0° to about 300° C., preferably at solution polymerization temperatures, e.g., from about 130° C. to about 250° C. for a residence time of about a few seconds to several days, preferably 15 seconds to 2 hours. It is generally desirable to carry out the polymerization in the absence of moisture and oxygen and a catalytic amount of the catalytic reaction product is generally within the range from about 0.001 to about 0.1 millimoles titanium per liter of diluent. It is understood, however, that the most advantageous catalyst concentration will depend upon polymerization conditions such as temperature, pressure, solvent and presence of catalyst poisons and that the foregoing range is given to obtain maximum catalyst yields in weight of polymer per unit weight of titanium. Generally in the polymerization process, a carrier which may be an inert organic diluent or solvent or excess monomer, is generally employed. In order to realize the full benefit of the high efficiency catalyst of the present invention, care must be taken to avoid oversaturation of the solvent with polymer. If such saturation occurs before the catalyst becomes depleted, the full efficiency of the catalyst is not realized. For best results, it is preferred that the amount of polymer in the carrier not exceed about 50 weight percent based on the total weight of the reaction mixture.

It is understood that inert diluents employed in the polymerization recipe are suitably as defined hereinbefore.

The polymerization pressures preferably employed are relatively low, e.g., from about 50 to about 1000 psig, especially from about 100 to about 600 psig. However, polymerization within the scope of the present invention can occur at pressure from atmospheric up to pressures determined by the capabilities of the polymerization equipment. During polymerization it is desirable to stir the polymerization recipe to obtain better temperature control and to maintain uniform polymerization mixtures throughout the polymerization zone.

In order to optimize catalyst yields in the polymerization of ethylene, it is preferable to maintain an ethylene concentration in the solvent in the range from about 1 to about 10 weight percent, most advantageously about 1.2 to about 2 weight percent. To achieve this, when an excess of ethylene is fed into the system, a portion of the ethylene can be vented.

Hydrogen can be employed in the practice of this invention to alter the molecular weight of the resultant polymer. For the purpose of this invention, it is beneficial to employ hydrogen in concentrations ranging from about 0.001 to about 1 mole per mole of monomer. The larger amounts of hydrogen within this range are found to produce generally lower molecular weight polymers. It is understood that hydrogen can be added with a monomer stream to the polymerization vessel or separately added to the vessel before, during or after addition of the monomer to the polymerization vessel, but during or before the addition of the catalyst.

The monomer or mixture of monomers is contacted with the catalytic reaction product in any conventional manner, preferably by bringing the catalytic reaction product and monomer together with intimate agitation provided by suitable stirring or other means. Agitation can be continued during polymerization, or in some instances, the polymerization can be allowed to remain unstirred while the polymerization takes place. In the case of more rapid reactions with more active catalysts, means can be provided for refluxing monomer and solvent, if any of the latter is present and thus removing the heat of reaction. In any event adequate means should be provided for dissipating the exothermic heat of polymerization. If desired, the monomer can be brought in the vapor phase into contact with the catalytic reaction product, in the presence or absence of liquid material. The polymerization can be effected in the batch manner, or in a continuous manner, such as, for example, by passing the reaction mixture through an elongated reaction tube which is contacted externally with suitable cooling medium to maintain the desired reaction temperature, or by passing the reaction mixture through an equilibrium overflow reactor or a series of the same.

The polymer is readily recovered from the polymerization mixture by driving off unreacted monomer and solvent if any is employed. No further removal of impurities is required. Thus, a significant advantage of the present invention is the elimination of the catalyst residue removal steps. In some instances, however, it may be desirable to add a small amount of a catalyst deactivating reagent of the types conventionally employed for deactivating Ziegler catalysts. The resultant polymer is found to contain insignificant amounts of catalyst residue and to possess a relatively broad molecular weight distribution.

The following examples are given to illustrate the invention, and should not be construed as limiting its scope. All parts and percentages are by weight unless otherwise indicated.

The following atomic weight values were employed in the examples to calculate the ratios of the components.

Al = 26.98
C = 12.01
Cl = 35.45
H = 1.01
Mg = 24.31
O = 16.00
Ti = 47.90

In the following examples and comparative experiments, the melt index values $I_2$ and $I_{10}$ were determined by ASTM D 1238-70 and the density values were determined by ASTM D 1248.

COMPARATIVE EXPERIMENT A

A. Preparation of the dihydrocarbyloxytitanium oxide

To 14.88 ml of 0.336 M Ti(OiPr)$_4$ are added, with intense stirring, 0.09 ml of deionized and deoxygenated water. After allowing 1 to 2 minutes for reaction, 85.03 ml of 2,2,4-trimethylpentane was added to bring the total volume to 100.0 ml. This results in a 0.05 M solution of the diisopropoxytitanium oxide. The resulting reaction product is a slurry of rather coarse particles. All component mixing was accomplished at ambient temperature.

B. Preparation of the Catalyst Composition

The catalyst composition was prepared by adding with stirring under a nitrogen atmosphere to a 120-ml serum bottle the following components in the indicated order:

97.98 ml of 2,2,4-trimethylpentane
0.75 ml of 1.00 M ethylaluminum dichloride (EADC) in 2,2,4-trimethylpentane
0.30 ml of 0.050 M diisopropoxytitanium oxide (Ti(OiPr)$_2$O) in 2,2,4-trimethylpentane
0.97 ml of 0.62 M butyl ethyl magnesium in 2,2,4-trimethylpentane The temperature of the serum bottle was maintained at ambient temperature (22° C.) and the reaction was observed to be complete within 5 minutes.

The atomic ratios in the catalyst components were as follows:
Mg/Ti = 40/1
Al/Ti = 50/1
excess Cl/Al = 0.40/1.

C. Polymerization

Two liters of 2,2,4-trimethylpentane are added to a one-gallon, stirred batch reactor and heated to 150° C. To this is added 9 psig of hydrogen, 130 psig of ethylene, and 5 ml (0.00075 mMole Ti) of the above catalyst. The temperature was controlled at 150° C. and the ethylene pressure was held constant during the total reaction time of 30 minutes. The catalyst yielded 135 gms of polymer for an efficiency of $3.76 \times 10^6$ wt. of polyethylene per wt. of titanium. The polymer has an $I_2$ melt index of 2.22, and $I_{10}$ melt index of 19.08, an $I_{10}/I_2$ ratio of 8.59, and a density of 0.9632.

EXAMPLE 1

A. Preparation of the Catalyst Composition

The catalyst components were added to a 120 ml serum bottle in the following order with stirring under a nitrogen atmosphere:
97.91 ml of 2,2,4-trimethylpentane 0.75 ml of 1.00 M EADC in 2,2,4-trimethylpentane
0.225 ml of 0.050 M Ti(OiPr)$_2$O in 2,2,4-trimethylpentane
0.97 ml of 0.62 M butyl ethyl magnesium in 2,2,4-trimethylpentane
0.15 ml of 0.025 M tetraisopropoxy titanium (Ti(OiPr)$_4$) in 2,2,4-trimethylpentane The molar ratio of Ti(OiPr)$_2$O:Ti(OiPr)$_4$=3:1.

The atomic ratios of the catalyst components were as follows:
Mg/Ti=40/1
Al/Ti=50/1
excess Cl/Al=0.40/1

B. Polymerization

Employing the procedure of Comparative Experiment A, 5 ml (0.00075 mMole Ti) of this catalyst yielded 168 gms of polymer for a catalyst efficiency of 4.68×10$^6$ wt. of polyethylene per wt. of titanium. The polymer had an I$_2$ melt index of 1.21, an I$_{10}$ melt index of 11.73, a I$_{10}$/I$_2$ ratio of 9.69 and a density of 0.9622.

EXAMPLE 2

A. Preparation of the catalyst composition

The catalyst components were added to a 120-ml serum bottle in the following order with stirring under a nitrogen atmosphere:
97.76 ml of 2,2,4-trimethylpentane
0.75 ml of 1.00 M EADC in 2,2,4-trimethylpentane
0.075 ml of 0.050 M Ti(OiPr)$_2$O in 2,2,4-trimethylpentane
0.97 ml of 0.62 M butyl ethyl magnesium in 2,2,4-trimethylpentane
0.45 ml of 0.025 M Ti(OiPr)$_4$ in 2,2,4-trimethylpentane The molar ratio of Ti(OiPr)$_2$O:Ti(OiPr)$_4$=0.33:1.

The atomic ratios of the catalyst components were as follows:
Mg/Ti=40/1
Al/Ti=50/1
excess Cl/Al=0.40/1

B. Polymerization

Employing the procedure of Comparative Experiment A, 5 ml (0.00075 mMole Ti) of this catalyst yielded 182 gms of polymer for a catalyst efficiency of 5.07×10$^6$ wt. of polyethylene per wt. of titanium. The polymer had an I$_2$ melt index of 1.20, an I$_{10}$ melt index of 12.17, a I$_{10}$/I$_2$ ratio of 10.14 and a density of 0.9619.

EXAMPLE 3

A. Preparation of the catalyst composition

The catalyst components were added to a 120-ml serum bottle in the following order with stirring under a nitrogen atmosphere:
97.83 ml of 2,2,4-trimethylpentane
0.75 ml of 1.00 M EADC in 2,2,4-trimethylpentane
0.15 ml of 0.050 M Ti(OiPr)$_2$O in 2,2,4-trimethylpentane
0.97 ml of 0.62 M butyl ethyl magnesium in 2,2,4-trimethylpentane
0.30 ml of 0.025 M Ti(OiPr)$_4$ in 2,2,4-trimethylpentane The molar ratio of Ti(OiPr)$_2$O:Ti(OiPr)$_4$=1:1.

The atomic ratios of the catalyst components were as follows:
Mg/Ti=40/1
Al/Ti=50/1
excess Cl/Ti=0.40/1

B. Polymerization

Employing the procedures of this catalyst, 5 ml (0.00075 mMole Ti) of this catalyst yielded 173.9 gms of polymer for a catalyst efficiency of 4.84×10$^6$ wt. of polyethylene per wt. of titanium. The polymer had an I$_2$ melt index of 2.04, an I$_{10}$ melt index of 18.95, a I$_{10}$/I$_2$ ratio of 9.29 and a density of 0.9627.

COMPARATIVE EXPERIMENT B

A. Preparation of the catalyst composition

The catalyst components were added to a 120 ml serum bottle in the following order with stirring under a nitrogen atmosphere:
97.68 ml of 2,2,4-trimethylpentane
0.75 ml of 1.00 M EADC in 2,2,4-trimethylpentane
0.60 ml of 0.025 M Ti(OiPr)$_4$ in 2,2,4-trimethylpentane
0.97 ml of 0.62 M butyl ethyl magnesium in 2,2,4-trimethylpentane The atomic ratios of the catalyst components were as follows:
Mg/Ti=40/1
Al/Ti=50/1
excess Cl/Ti=0.40/1

B. Polymerization

Employing the same procedure of Comparative Experiment A, 5 ml (0.00075 mMole Ti) of this catalyst yielded 138.3 gms of polymer for a catalyst efficiency of 3.85×10$^6$ wt. polymer per wt. of titanium.

These examples and comparative experiments demonstrate that mixtures of Ti(OiPr)$_4$ with the Ti(OiPr)$_2$O interact synergistically to produce catalyst efficiencies higher than either component individually.

We claim:

1. In a catalytic reaction product of (A) a tetravalent titanium compound; (B) an organomagnesium component; and (C) a halide source, however if either component (B) or (C) does not contain sufficient quantities of aluminum, then (D) an organoaluminum compound is also present, said catalytic reaction product having atomic ratios of Mg:Ti is from about 1:1 to about 200:1;
Al:Ti is from about 0.1:1 to about 1000:1;
excess X:Al is from about 0.0005:1 to about 5:1;

the improvement which comprises employing as the tetravalent titanium compound, a mixture of (a) a tetrahydrocarbyloxytitanium compound and (b) a dihydrocarbyloxytitanium oxide in a molar ratio of (a):(b) of from about 0.1:1 to about 10:1; and wherein excess X is the amount of excess halide above that which would be theoretically required to convert the magnesium compound to the dihalide.

2. A catalytic reaction product of claim 1 wherein the halide source contains aluminum; the tetrahydrocarbyloxytitanium compound is represented by the empirical formula Ti(OR)$_4$ wherein each R is independently an alkyl group or an aryl group having from 1 to about 12 carbon atoms; the dihydrocarbyloxytitanium oxide is represented by the empirical formula (RO)$_2$TiO wherein each R is as defined above; the molar ratio of (a):(b) is from about 0.2:1 to about 5:1; and wherein the catalytic reaction product has the following atomic ratios Mg:Ti is from about 2:1 to about 100:1;
Al:Ti is from about 0.5:1 to about 200:1;
excess X:Al is from about 0.001:1 to about 2:1.

3. A catalytic reaction product of claim 2 wherein the halide source is an alkylaluminum halide; the R groups in the formulas for the titanium compounds are alkyl groups having from about 1 to about 10 carbon atoms and the molar ratio of (a):(b) is from about 0.33:1 to about 3:1; and wherein the catalytic reaction product has the following atomic ratios
   Mg:Ti is from about 5:1 to about 75:1;
   Al:Ti is from about 1:1 to about 75:1;
   excess X:Al is from about 0.01:1 to about 1.4:1.

4. A catalytic reaction product of claim 3 wherein the organomagnesium component is a dihydrocarbyl magnesium.

5. A catalytic reaction product of claim 4 wherein the dihydrocarbyl magnesium is n-butyl-sec-butyl magnesium, di-n-hexyl magnesium, ethyl-n-butyl magnesium, diisopropyl magnesium or ethyl-n-hexyl magnesium.

6. A catalytic reaction product of claim 3 wherein the organomagnesium component is a complex of a dialkyl magnesium and a trialkyl aluminum wherein the atomic ratio of Mg:Al in said complex is within the range of from about 0.3:1 to about 1000:1.

7. A catalytic reaction product of claim 6 wherein the complex is di-n-butyl magnesium.1/6 triethyl aluminum.

* * * * *